United States Patent [19]
Ukai et al.

[11] Patent Number: 5,696,365
[45] Date of Patent: Dec. 9, 1997

[54] BAR CODE RECORDING DEVICE FOR A PAPER MEDIA SYSTEM

[75] Inventors: Takeshi Ukai, Yokohama; Ryo Tamai, Kawasaki; Masakuni Kutsuwada, Tokyo, all of Japan

[73] Assignee: Ricoh Company, Ltd., Tokyo, Japan

[21] Appl. No.: 496,323

[22] Filed: Jun. 29, 1995

[30] Foreign Application Priority Data

Jun. 30, 1994 [JP] Japan .................................. 6-149694

[51] Int. Cl.⁶ .......................... G06K 7/10; G06K 5/00; G06F 17/00
[52] U.S. Cl. .......................... 235/375; 235/462; 235/380
[58] Field of Search .......................... 235/375, 462, 235/380; 382/298, 294; 358/450, 451

[56] References Cited

U.S. PATENT DOCUMENTS

| | | | |
|---|---|---|---|
| 4,728,984 | 3/1988 | Daniele | 355/201 |
| 4,952,785 | 8/1990 | Kikuda | 235/432 |
| 5,025,399 | 6/1991 | Wendt et al. | 364/519 |
| 5,191,429 | 3/1993 | Rourke | 358/296 |
| 5,199,081 | 3/1993 | Saito et al. | 235/380 |
| 5,327,170 | 7/1994 | Suzuki et al. | 346/160 |
| 5,357,348 | 10/1994 | Moro | 358/450 |
| 5,396,345 | 3/1995 | Motoyama | 358/448 |
| 5,506,697 | 4/1996 | Li et al. | 358/448 |

FOREIGN PATENT DOCUMENTS

| | | | |
|---|---|---|---|
| 403237589A | 10/1991 | Japan | 235/380 |
| WO 93/12509 | 6/1993 | WIPO . | |

*Primary Examiner*—Donald T. Hajec
*Assistant Examiner*—Thien Minh Le
*Attorney, Agent, or Firm*—Oblon, Spivak, McClelland, Maier & Neustadt, P.C.

[57] ABSTRACT

In a paper media system for reading a bidimensional bar code representative of, for example, the contents of a document, reproducing the contents, and displaying or outputting them, a bar code recording device combines a document image with a bar code image by reducing, or moving, or decomposing and rearranging the document image, and then prints them on a paper together. Hence, the document image is prevented from overlapping the bar code image on the paper. Further, a character image existing in a document image are transformed to a second bar code image. The second bar code image is combined with the above or first bar code image and then printed on a paper. Thins prevents the first and second bar code images from overlapping each other on the paper. In addition, because bar code images are provided with line widths and line distances capable of being read by a bar code reader, they can be surely read by a bar code reader.

2 Claims, 20 Drawing Sheets

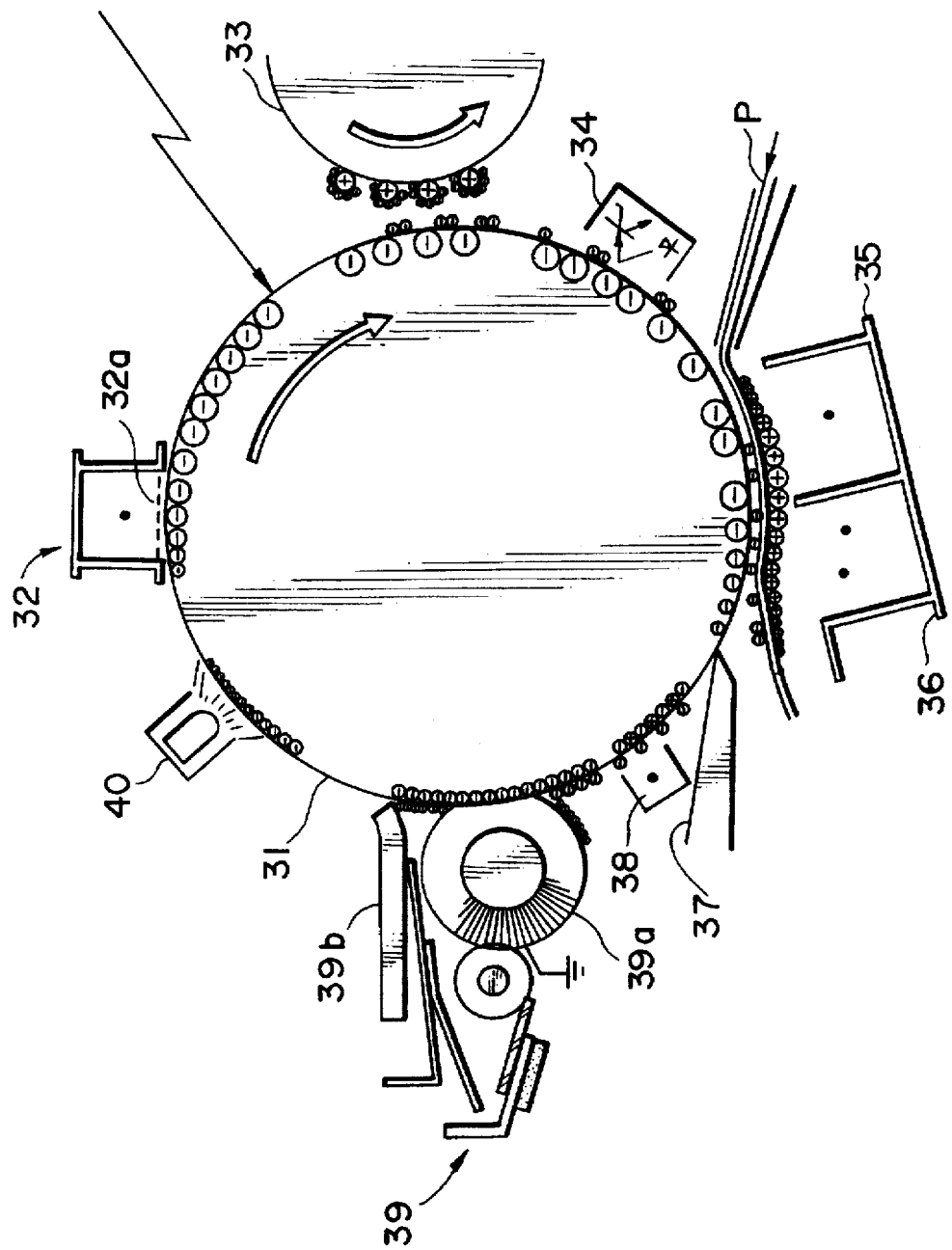

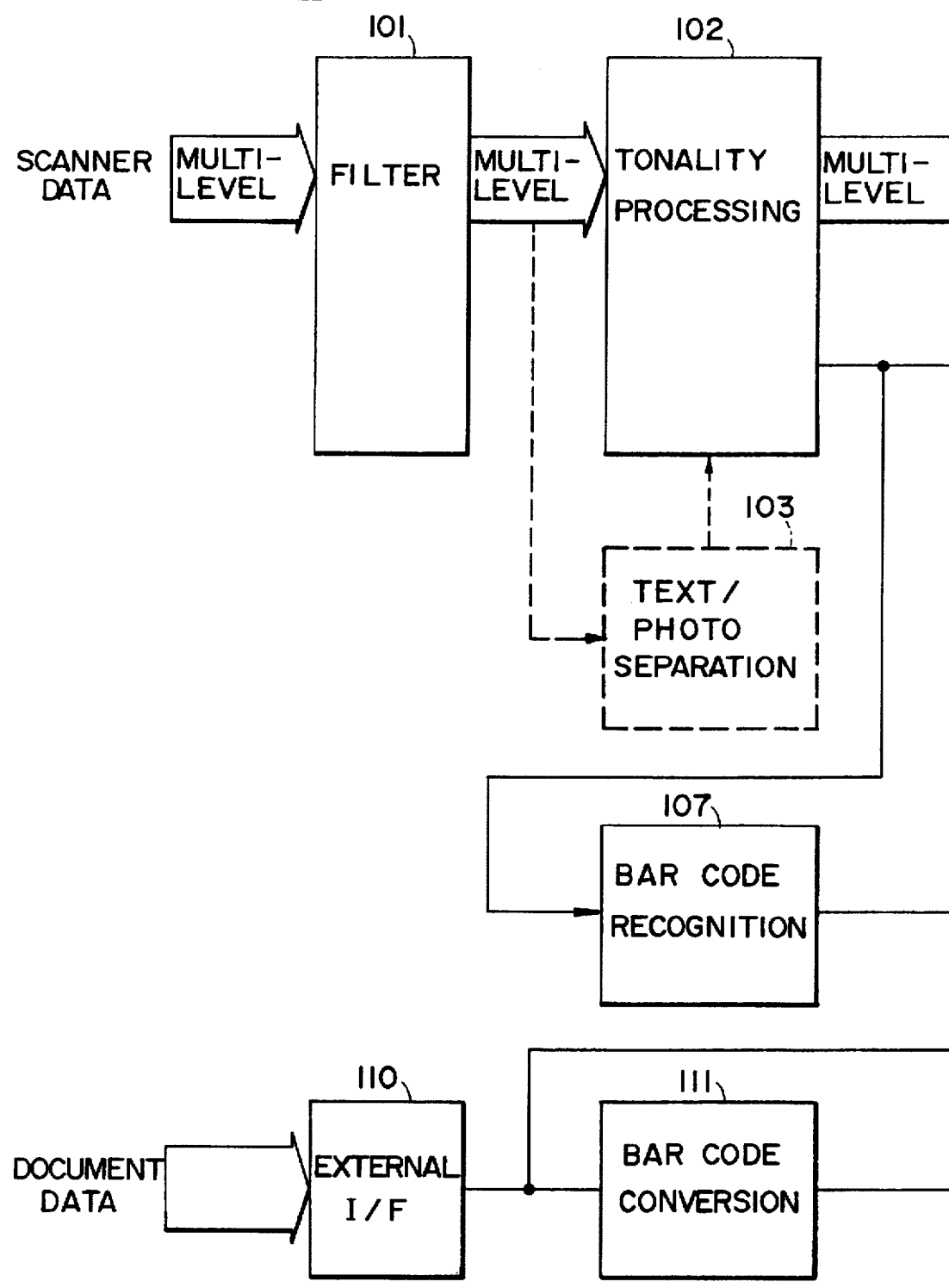

FIG. 4
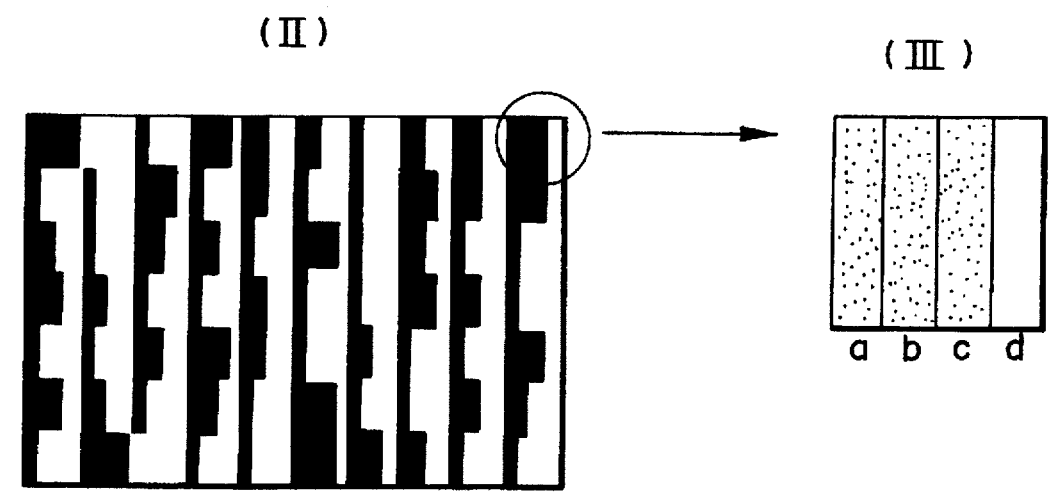
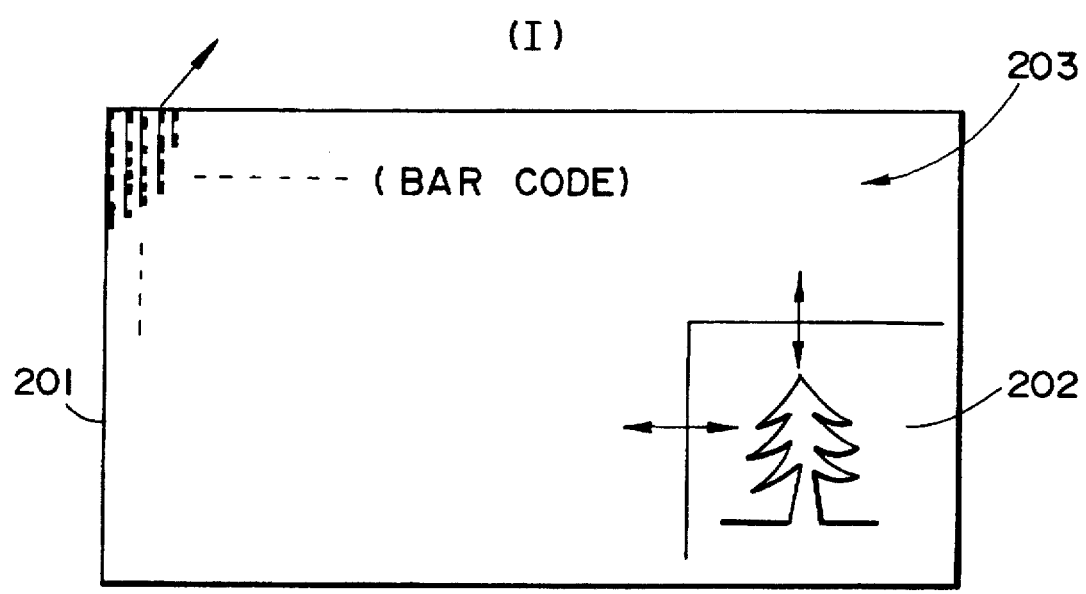

(WHEN IMAGE DENSITY IS LOW)

(WHEN IMAGE DENSITY IS HIGH)

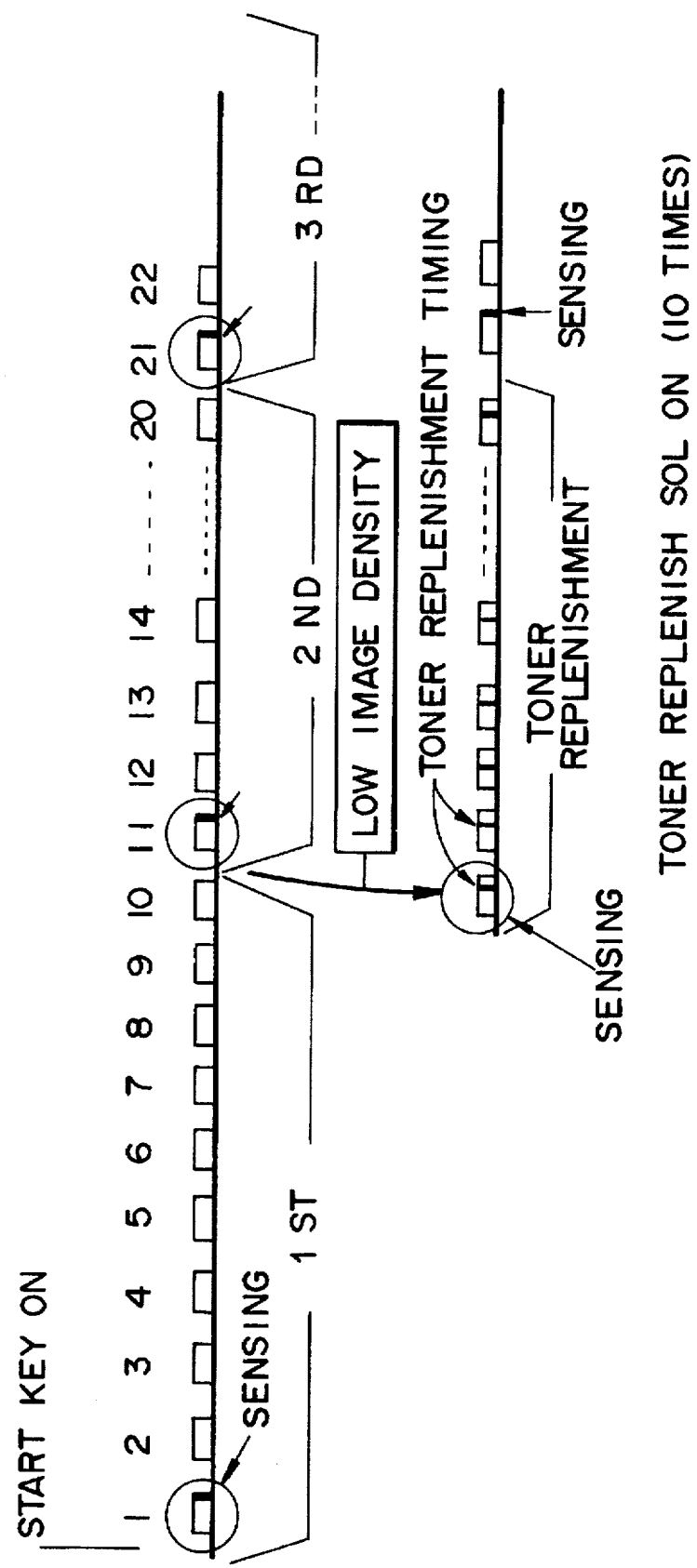

FIG. 24
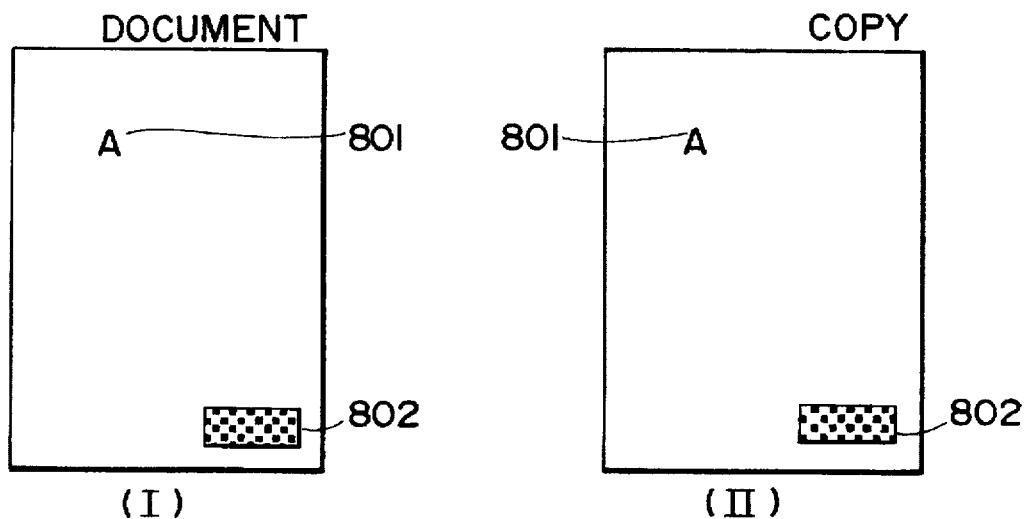
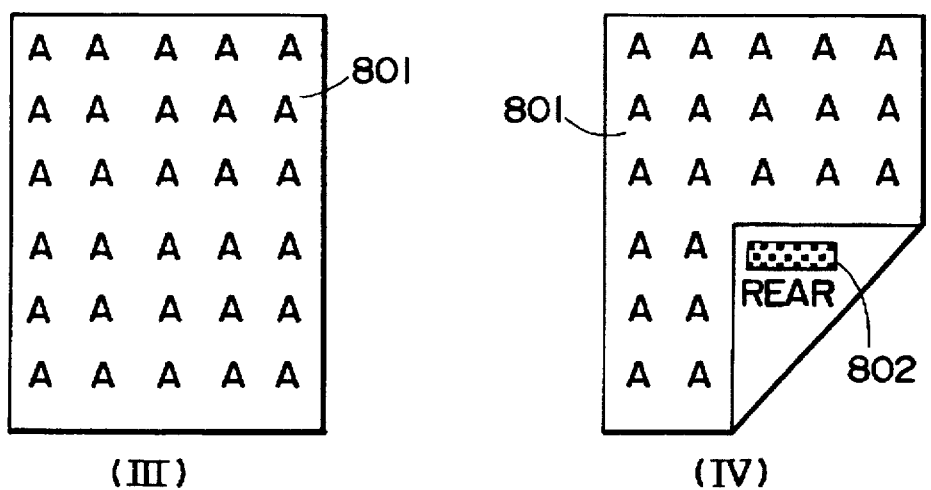
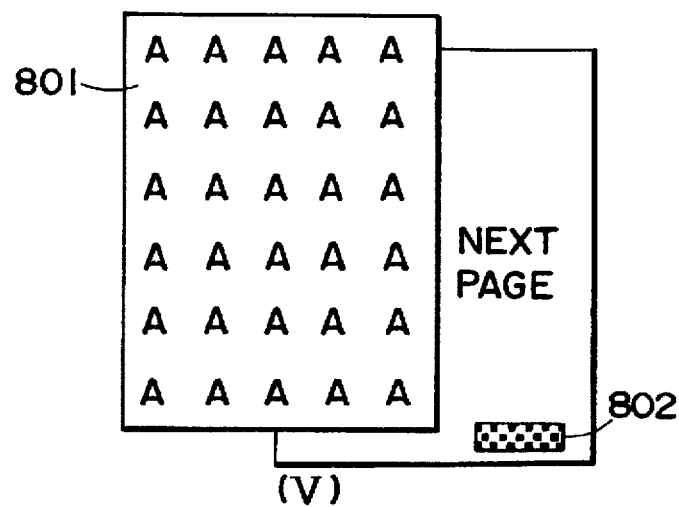

BAR CODE RECORDING DEVICE FOR A PAPER MEDIA SYSTEM

BACKGROUND OF THE INVENTION

The present invention relates to a paper media system for reading a bidimensional bar code representative of, for example, the contents of a document, reproducing the contents, and then displaying or outputting them. More particularly, the present invention is concerned with a bar code recording device for combining the bidimensional bar code and a document image and recording them in a paper.

A conventional bar code recording device for the above application has some problems left unsolved, as follows. When a bar code pattern is combined with a document image in such a manner as to be recorded in a predetermined position on a paper, the bar code pattern is illegible if it and the document image overlap each other. Further, the bar code pattern is representative only of data to be displayed or printed out, and minimum necessary physical information for reproducing the data. Hence, various control information from an application. e.g., the distinction between image information and code information, whether or nor an application is required, and the presence/absence of optional characters, optional character data, and the presence/absence of font designation which are necessary for display or printing must be entered by hand. Moreover, if a font is not designated, data cannot be faithfully displayed or printed out.

SUMMARY OF THE INVENTION

It is, therefore, an object of the present invention to provide a bar code recording device capable of recording a bar code pattern and a document image on a paper while preventing them from overlapping each other.

It is another object of the present invention to provide a bidimensional bar code allowing control information for the faithful display and printing to be recorded, and a paper media system capable of dealing with the bidimensional bar code.

A bar code recording device of the present invention has an inputting section for inputting data representative of a bar code, a bar code converting section for converting the data input via the inputting section to a bar code image, a reducing section for reducing the size of document image, a combining section for combining the bar code image and a document image reduced by the reducing section, and a recording section for recording a composite image output from the combining section in a paper.

A bar code recording device of the present invention has an inputting section for inputting data representative of a bar code, a bar code converting section for converting the data input via the inputting section w a bar code image, a moving section for moving a document image, a combining section for combining the bar code image and a document image moved by the moving section, and a recording section for recording a composite image output from the combining section in a paper.

A bar code recording device of the present invention has an inputting section for inputting data representative of a bar code, a bar code converting section for converting the data input via the inputting section to a bar code image, a rearranging section for decomposing a document image into a plurality of blocks, and for rearranging the blocks, a combining section for combining the bar code image and the blocks rearranged by the rearranging section, and a recording section for recording a composite image output from the combining means in a paper.

A bar code recording device of the present invention has an inputting section for inputting data representative of a bar code, a first bar code converting section for converting the data input via the inputting section to a bar code image, a second bar code converting section for converting a character image existing on a document image to a bar code image, a combining section for combining the bar code images output from the first and second bar code converting section, and a recording section for recording a composite image output from the combining section in a paper.

A bidimensional bar code of the present invention has a data portion bar code pattern storing a document or an image in a form of bar code, and a control portion bar code pattern storing control information for reproducing and reconstructing the document or the image.

A paper media system of the present invention has a reading section for reading a bidimensional bar code made up of a data portion bar code pattern storing a document or an image, and a control portion bar code pattern storing control information for displaying or outputting the data portion bar code pattern. A reproducing section reproduces at least the control portion bar code pattern read by the reading section. An analyzing section analyzes the control information. A data portion reproducing section reproduces the data portion bar code pattern on the basis of the result of analysis output from the analyzing section. A reconstructing section reconstructs the document or the image on the basis of the result of analysis.

An image forming apparatus of the present invention has an image inputting section for reading a document carrying an image and a bar code pattern, a converting section for converting image information output from the image inputting section to code information, an image reconverting section for reconvening the code information to image information, and an outputting section for recording the image information output from the image reconverting section in a paper or displaying the image information.

BRIEF DESCRIPTION OF THE DRAWINGS

The above and other objects, features and advantages of the present invention will become more apparent from the following detailed description taken with the accompanying drawings in which:

FIG. 2 is a section showing an image forming section included in the copier;

FIG. 4 shows a specific procedure available with the embodiment for combining a document image with a bar code image by reducing or moving the document image;

3

Figure 7:
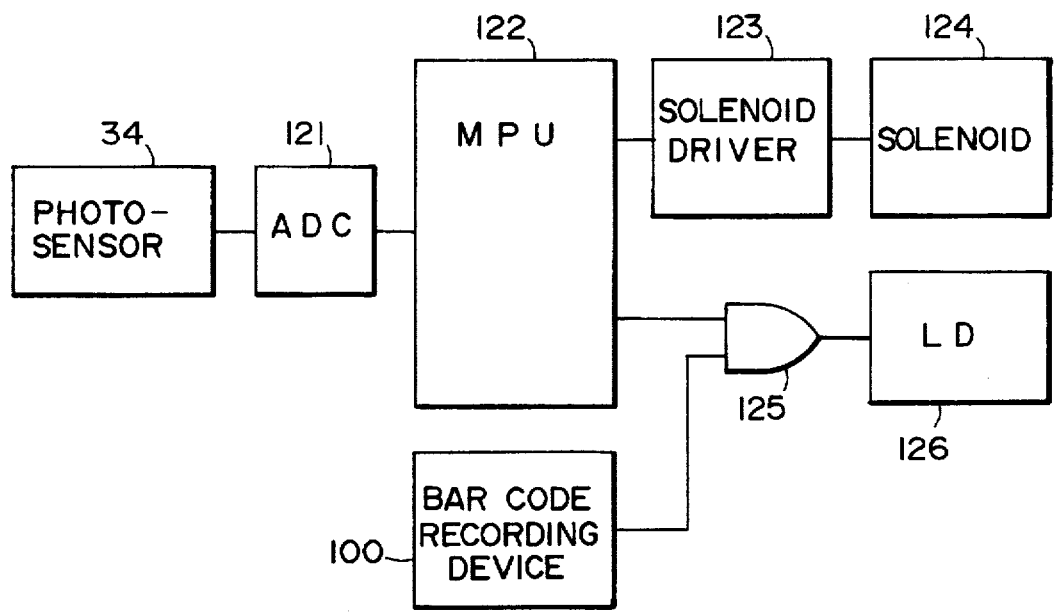
FIG. 7 is a block diagram schematically showing an arrangement for controlling image density and included in the embodiment.
Figure 8A:
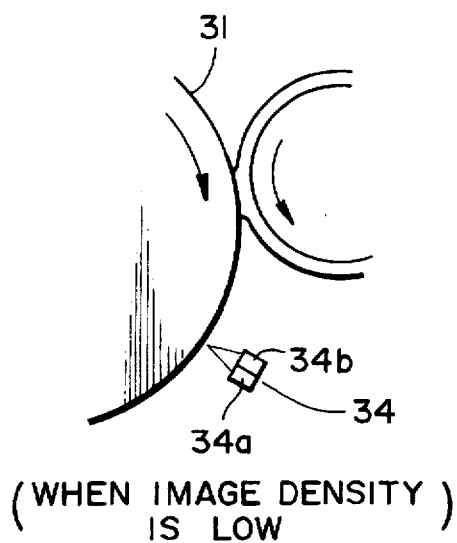
Figure 8B:
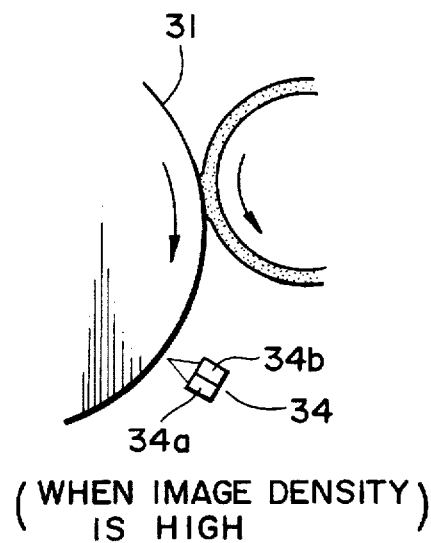
Figure 10:
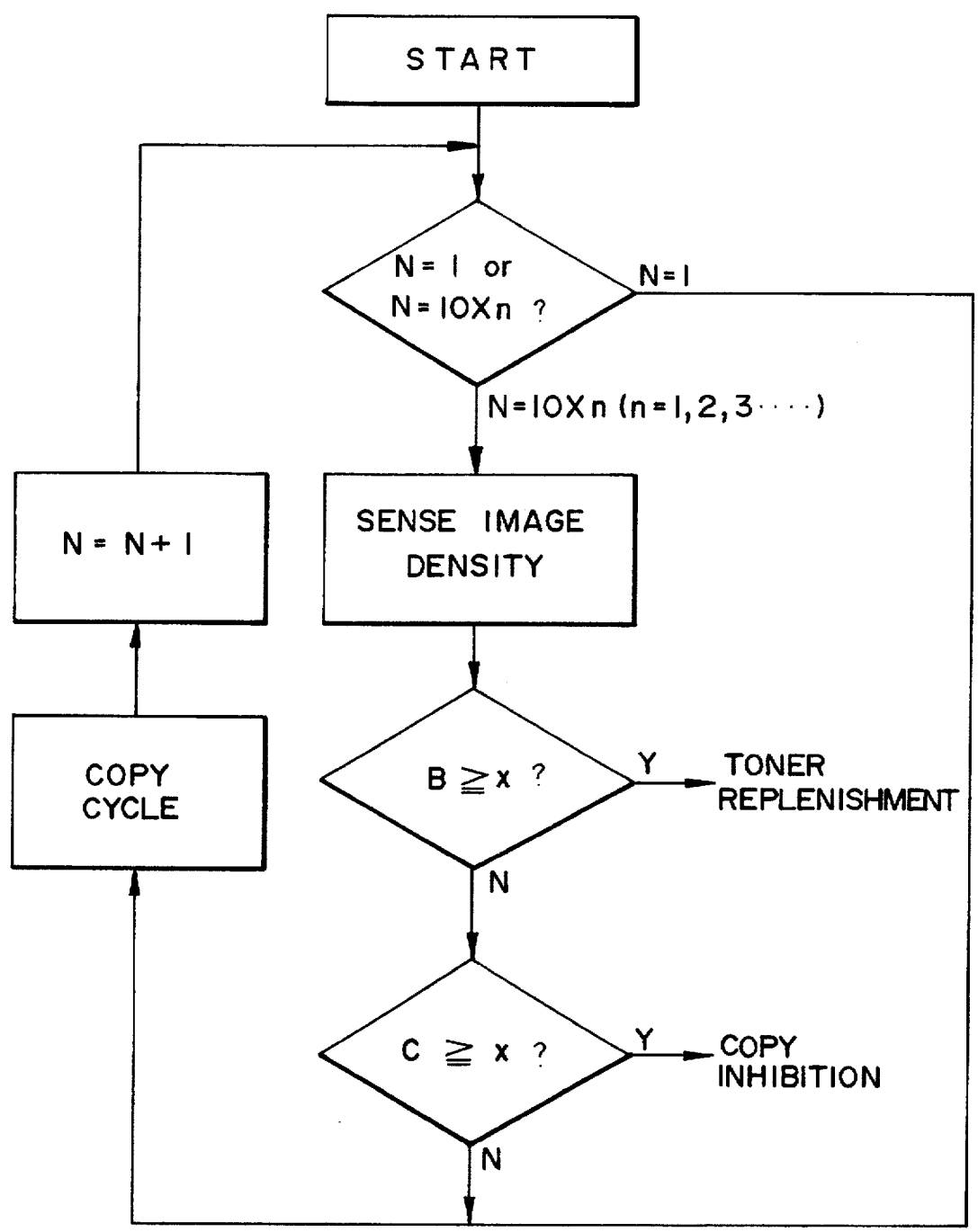
Figure 11:
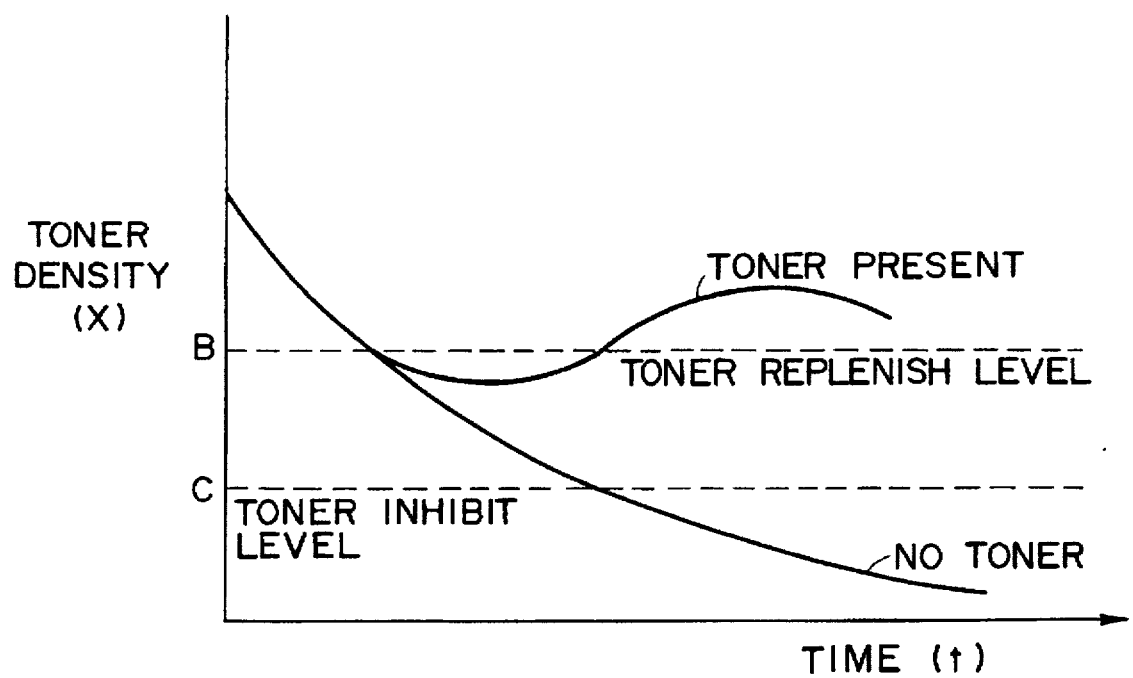
Figure 12:
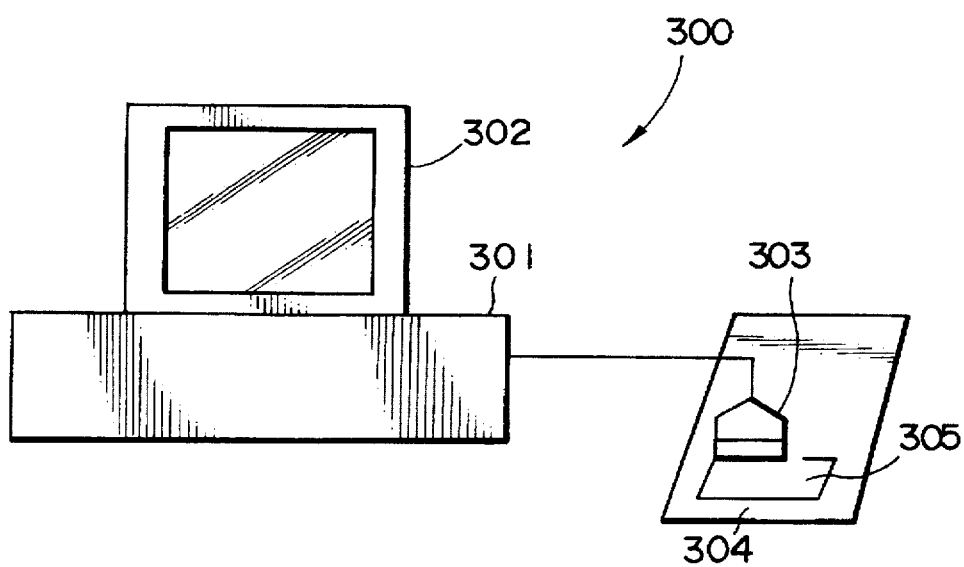
Figure 13:
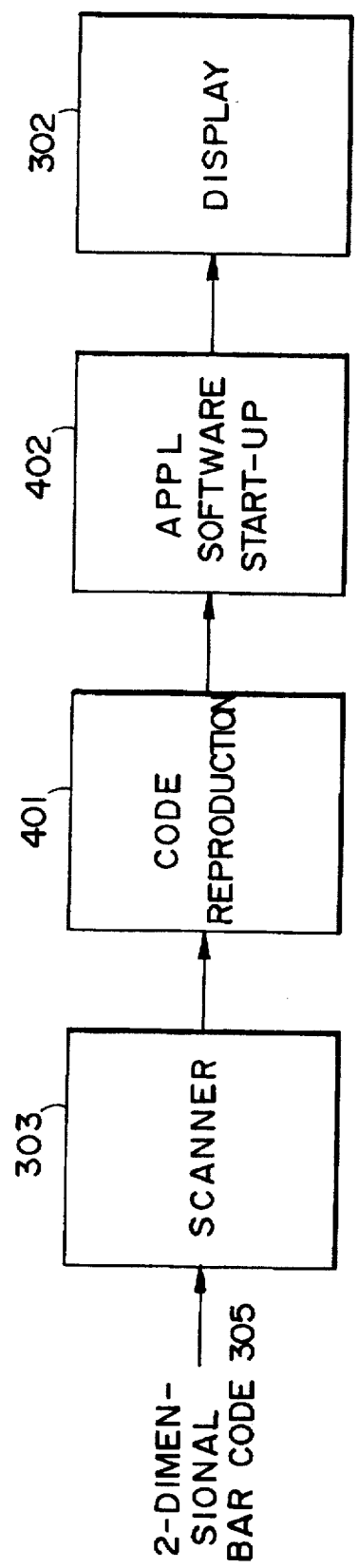
Figure 14:
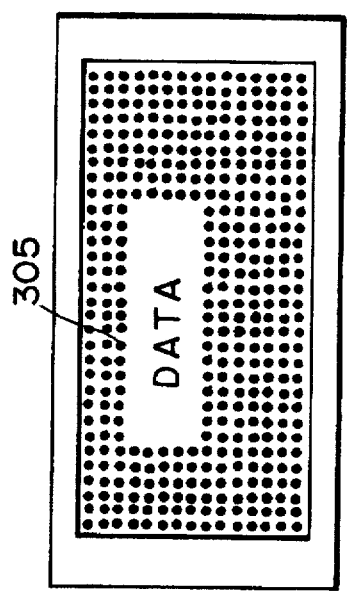
Figure 15:
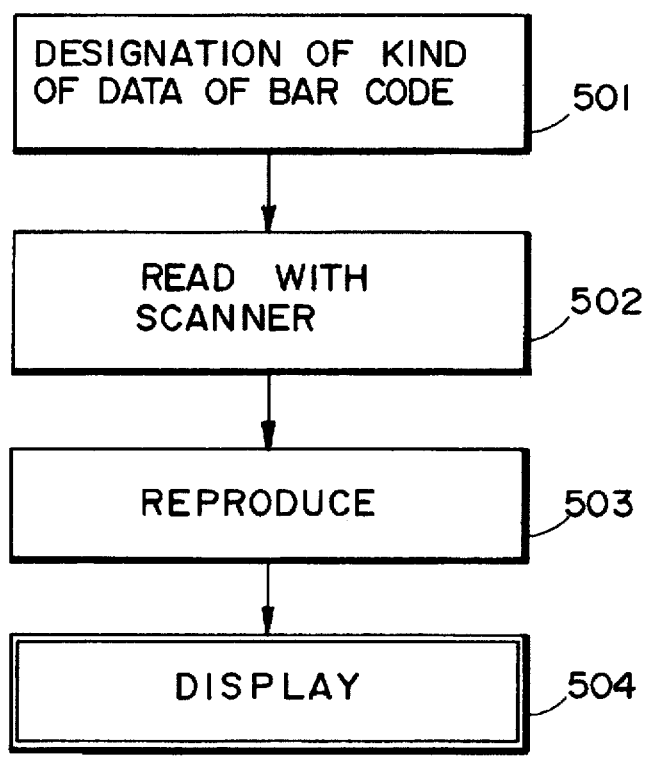
Figure 16:
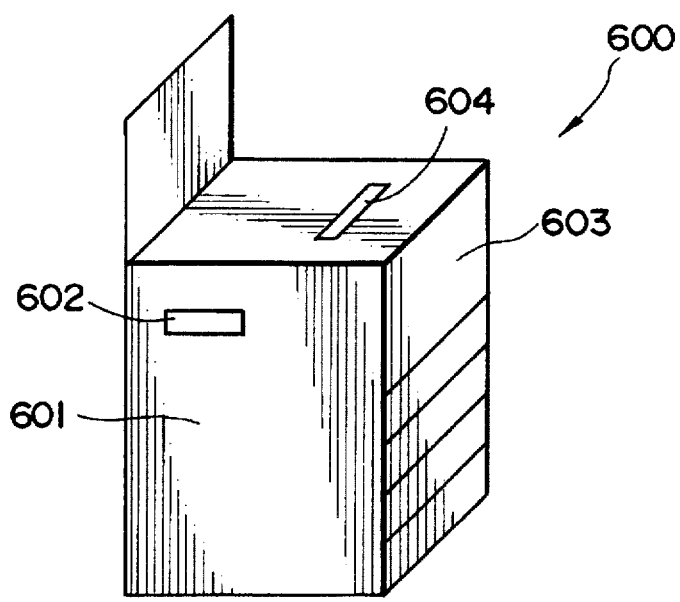
Figure 17:
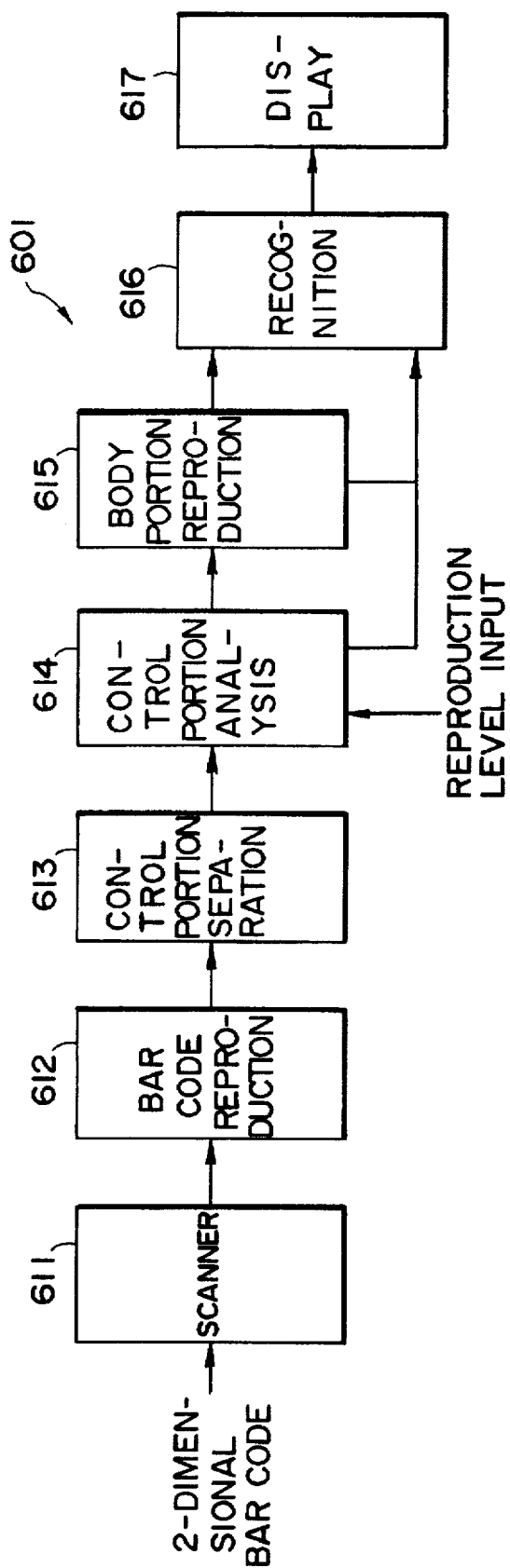
Figure 18:
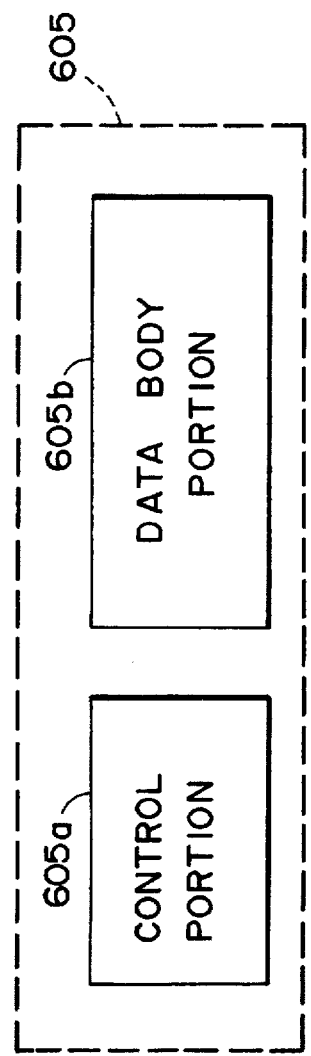
Figure 19:
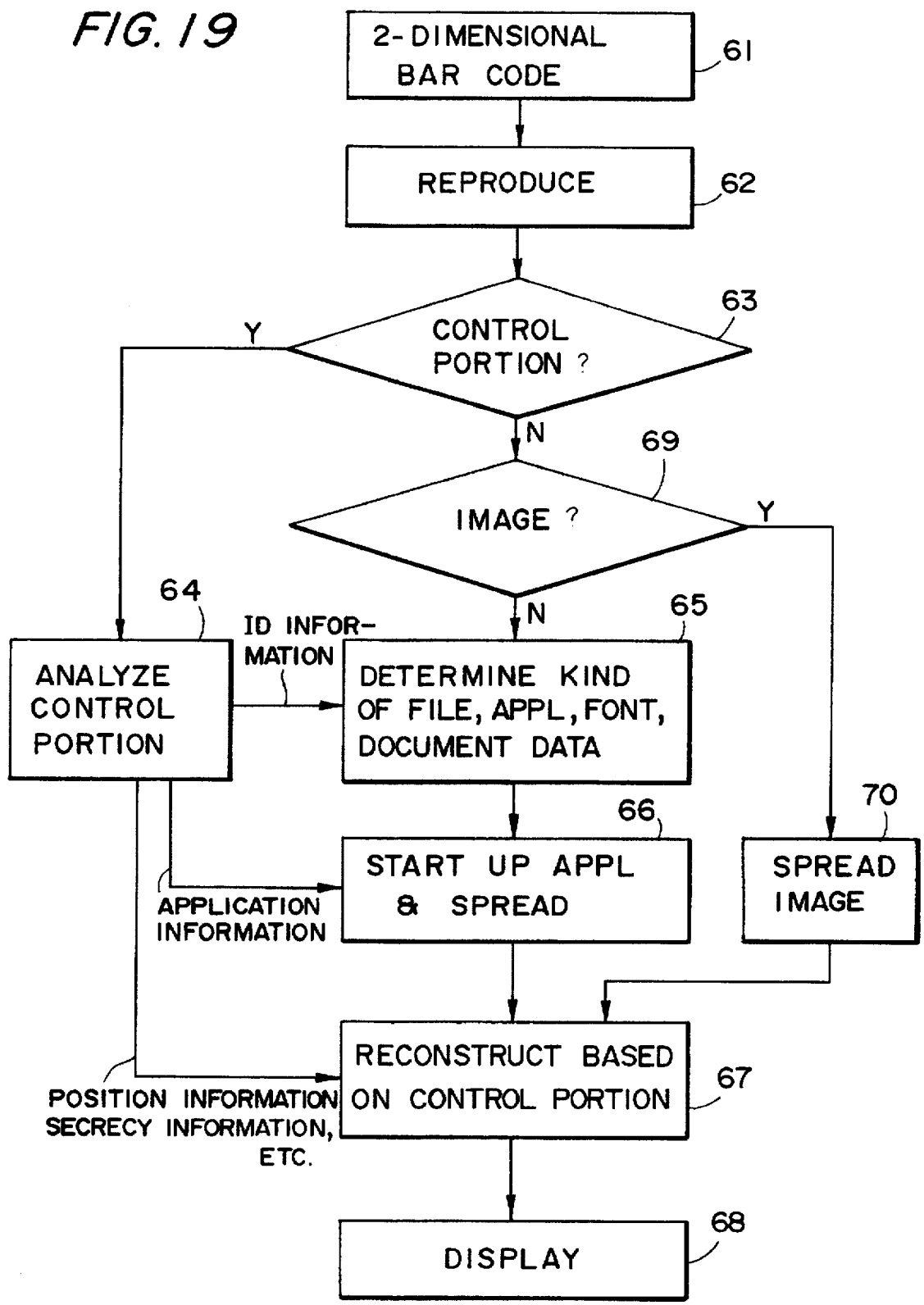
Figure 20:
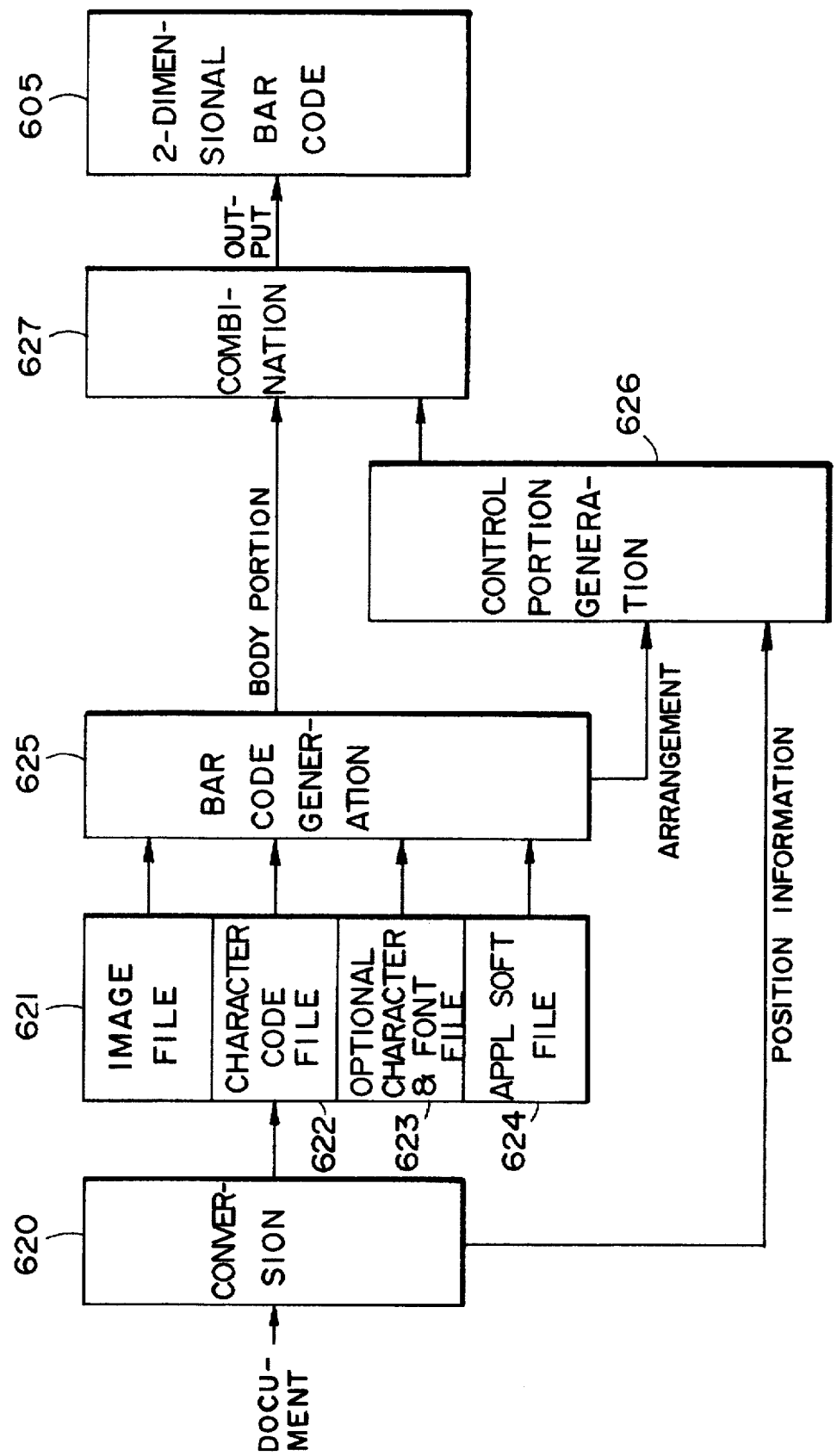
Figure 21:
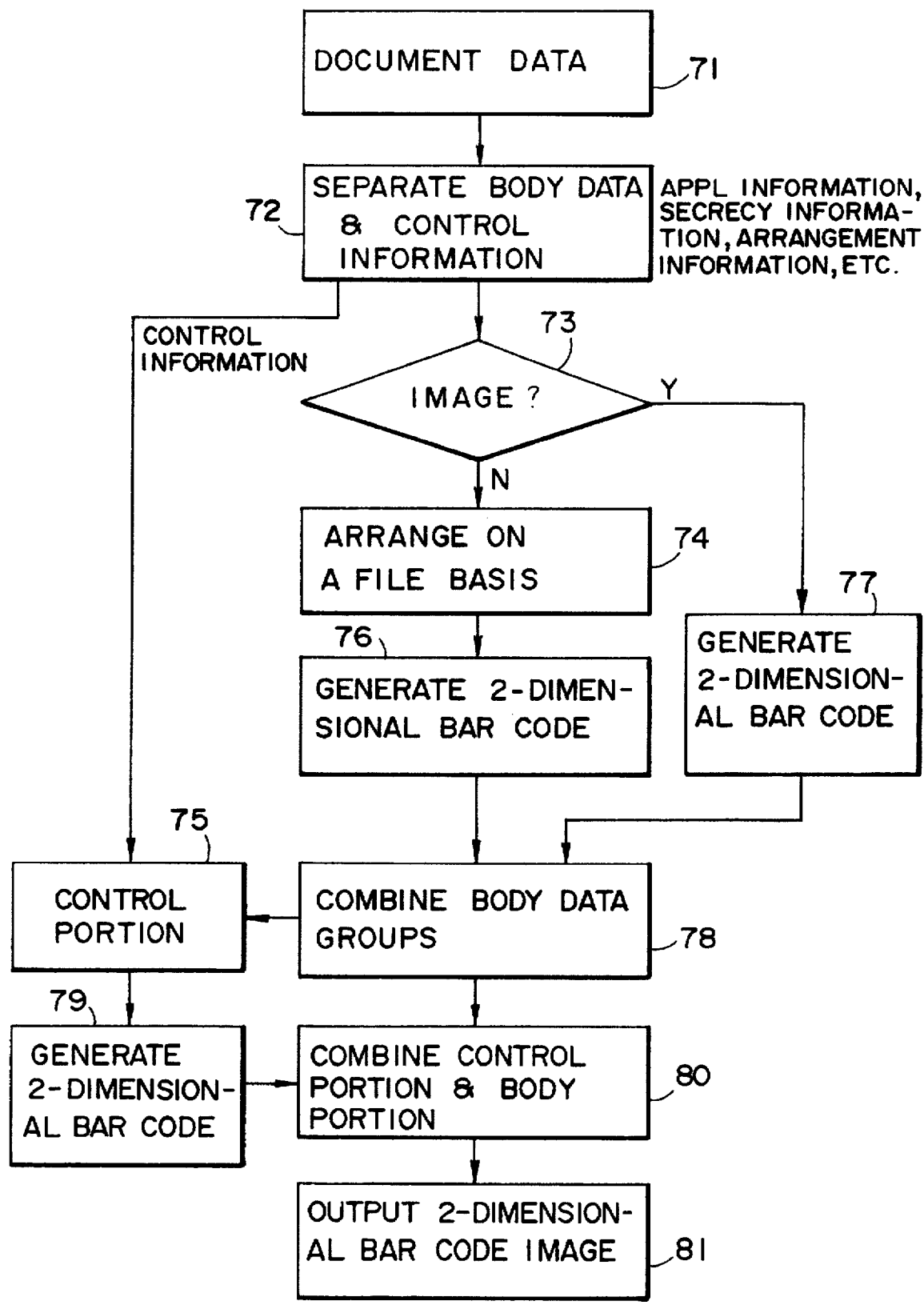
Figure 22:
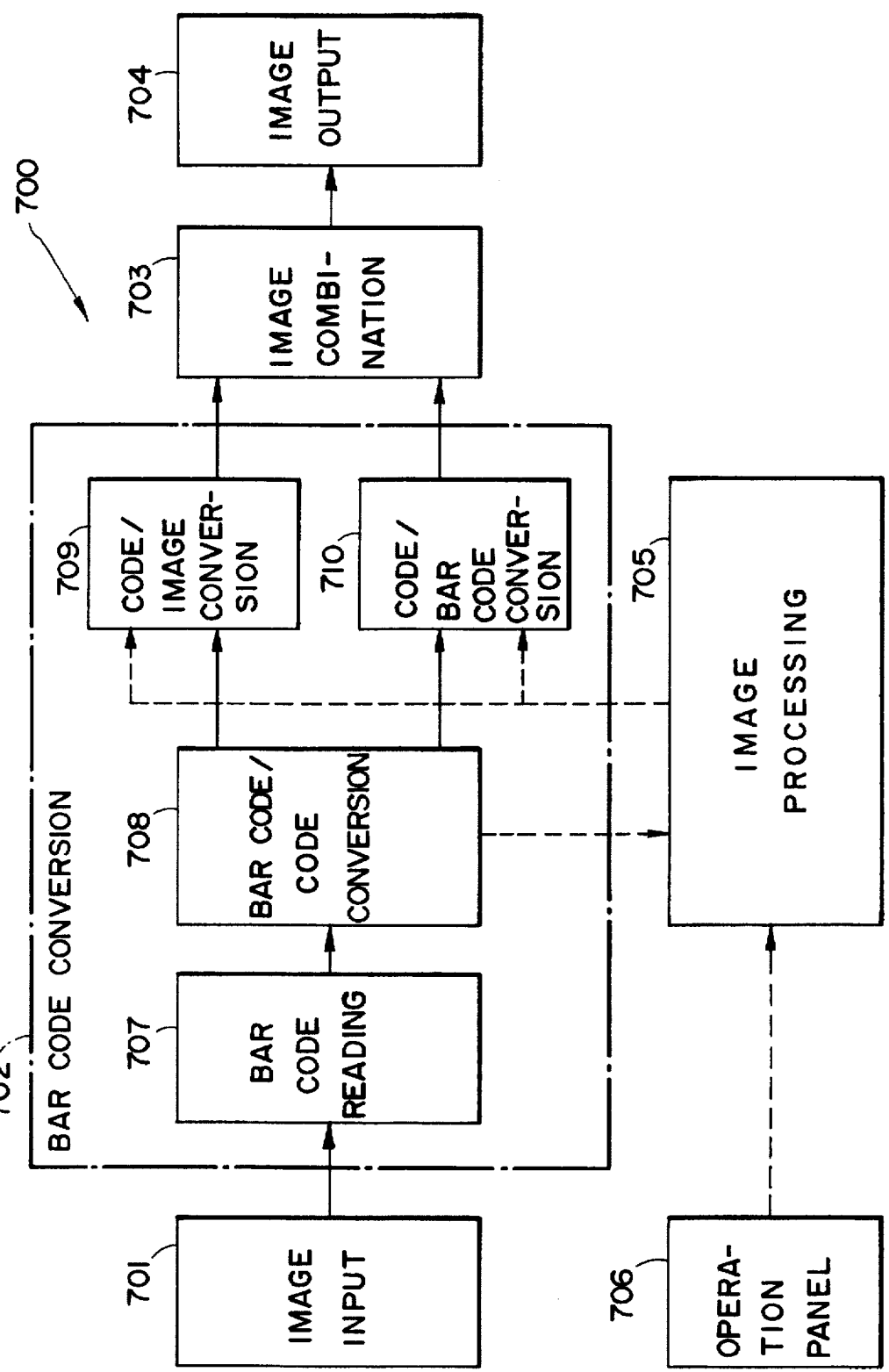
Figure 23:
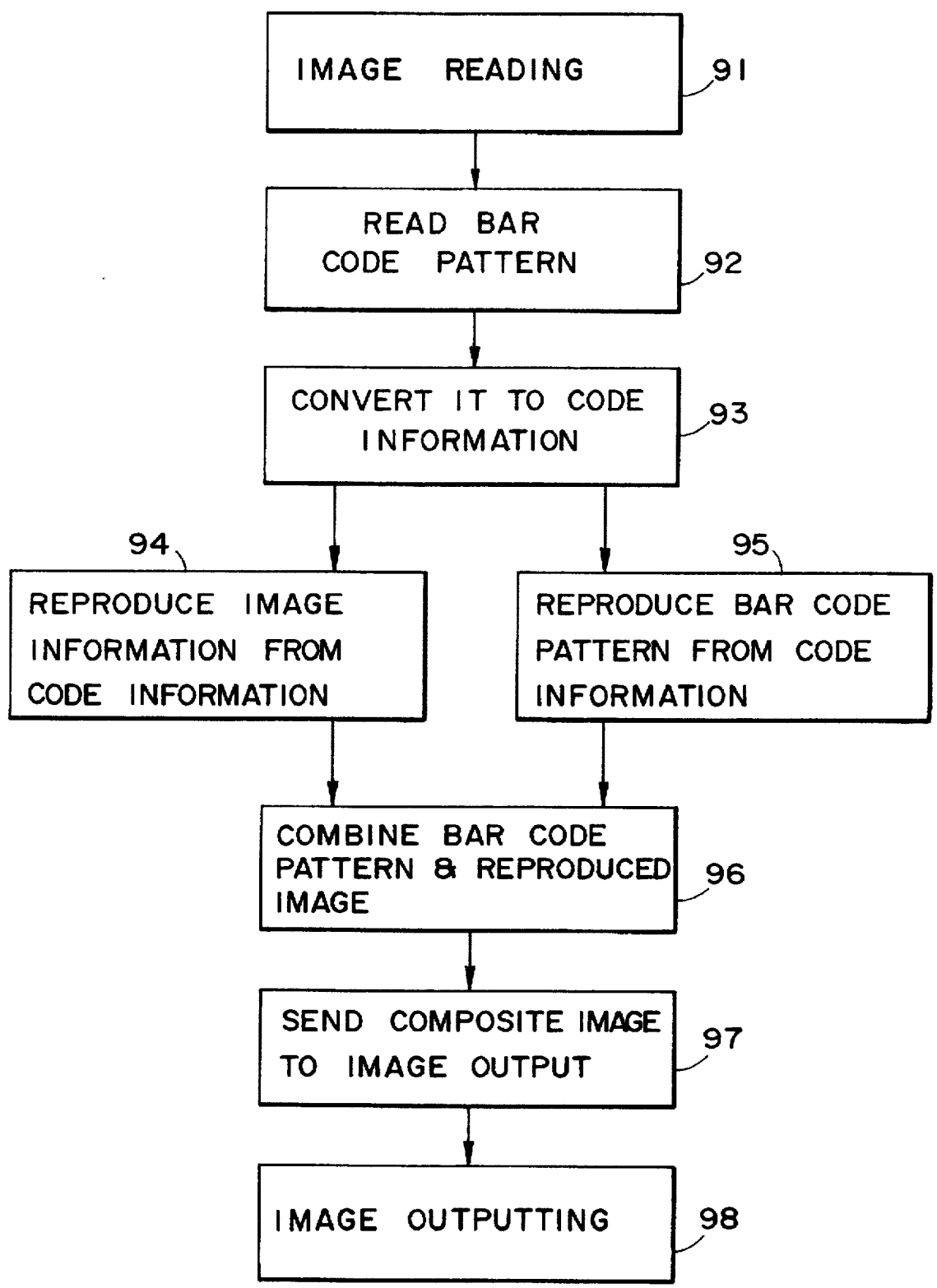
Figure 25:
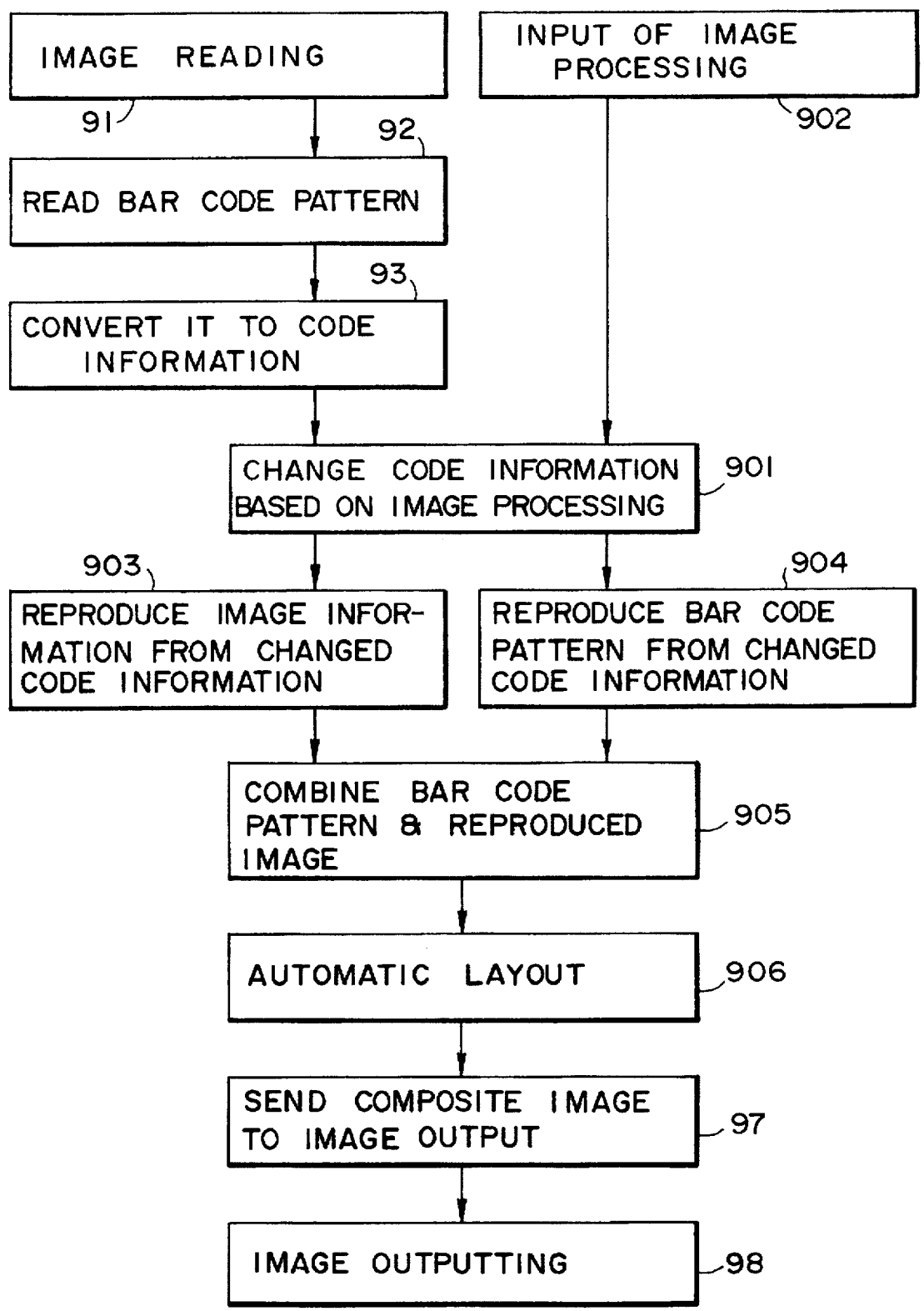

FIGS. 8A and 8B show a photosensor included in the arrangement of FIG. 7 and for sensing the density of a toner image formed on a photoconductive drum;

FIG. 9 is a timing chart representative of a toner density sensing timing;

FIG. 10 is a flowchart demonstrating a specific operation of the embodiment;

FIG. 11 is a graph showing the variation of a toner concentration;

FIG. 12 shows a conventional paper media system;

FIG. 13 is a block diagram schematically showing a processing device included in the conventional system;

FIG. 14 shows a specific bidimensional bar code recorded in a document;

FIG. 15 is a flowchart showing the operation of the conventional system for reproducing a file and starting up, if necessary, an application and displaying the file;

FIG. 16 is a perspective view of a paper media system representative of a second embodiment of the present invention;

FIG. 17 is a block diagram schematically showing a processing device included in the second embodiment;

FIG. 18 schematically shows a bidimensional bar code particular to the second embodiment;

FIG. 19 is a flowchart demonstrating a specific operation of the processing device of FIG. 17;

FIG. 20 is a schematic block diagram of a section for generating the bidimensional bar code;

FIG. 21 is a flowchart representative of a specific operation of the section shown in FIG. 20;

FIG. 22 is a schematic block diagram of an image forming apparatus representative of a third embodiment of the present invention;

FIG. 23 is a flowchart showing a specific operation of the third embodiment;

FIG. 24 shows specific automatic layout processing available with the third embodiment; and FIG. 25 is a flowchart showing image processing also available with the third embodiment.

DESCRIPTION OF THE PREFERRED EMBODIMENTS

Preferred embodiments of the bar code recording device in accordance with the present invention will be described hereinafter.

1st Embodiment

Figure 1:
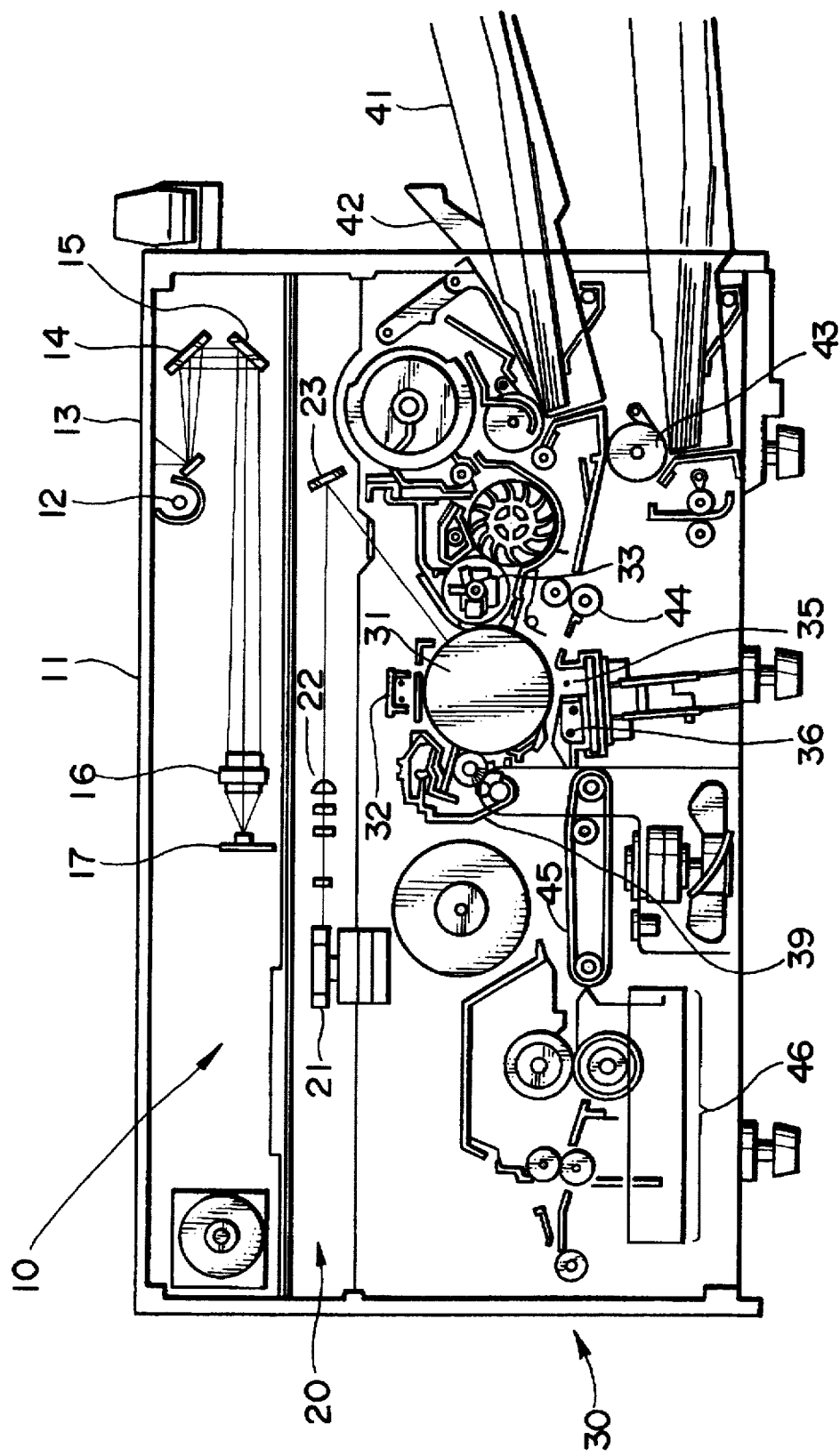
FIG. 1 is a section of a digital copier to which a bar code recording device representative of a first embodiment of the present invention is applied.

This embodiment is implemented as a bar code recording device for recording a bar code pattern on a paper together with a document image. To begin with, a digital copier to which the embodiment is applied will be described with reference to FIGS. 1 and 2. As shown, the copier is generally made up of reading optics (scanner) 10, an image processing circuit (bar code recording device) shown in FIG. 3, writing optics 20, and a printer 30.

The reading optics 10 includes a fluorescent lamp 12 for illuminating a document laid on a glass platen 11. An imagewise reflection from the document is routed through a first mirror 13, a second mirror 14 and a third mirror 15 to a lens 16. The lens 16 focuses the incident light onto a CCD (Charge Coupled Device) image sensor 17. The image read by the image sensor 17 is output to the bar code recording device 100. The ratio in speed between the lamp 12 and mirror 13 and the mirrors 14 and 15 is variable to change the magnification in the subscanning direction.

In the writing optics 20, a laser diode, not shown, emits a laser beam in accordance with an image signal processed by and output from the recording device 100. The laser beam is steered by a polygonal mirror 21 in the main scanning direction and then routed through an f-theta lens 22 and a mirror 23 to a photoconductive drum 31 included in the printer 30.

As shown in FIG. 2, a main charger 32, also included in the printer 30, uniformly charges the surface of the drum 31 to the negative polarity by corona discharge in the dark. The charger 32 has a grid 32a for maintaining the potential on the drum 31 constant. When the laser beam from the laser diode scans the charged surface of the drum 31, it dissipates the negative charge in the image portion (black portion) of the drum 31. A developing sleeve 33 charges toner to the negative polarity by friction. A negative bias (e.g. −550 V) is applied to the negatively charged toner. As a result, the toner is deposited on the image portion of the drum 31 where the negative charge has been lost.

A photosensor 34 senses the density of a predetermined toner pattern formed on the drum 31. A toner replenishing clutch, not shown, is turned on and turned off in response to the output of the photosensor 34 in order to control the toner concentration, i.e., image density. This procedure is effected once for ten copies. When a paper P is brought into contact with the drum 31, a transfer charge 35 applies a positive charge from the rear of the paper P. Consequently, the toner charged to the negative polarity is transferred from the drum 31 to the front of the paper P. Subsequently, a separation charger 36 dissipates the positive charge deposited on the paper P, thereby separating the paper P from the drum 31. After the image transfer and paper separation, a precleaning charger (PPC) 38 applies an AC positive/negative charge to the drum 31 in order to dissipate the positive charge remaining on the drum 31. A cleaning unit 39 and a fur brush 39a and a cleaning blade 39b. The fur brush 39a further dissipates the charge remaining on the drum 31, and then the cleaning blade 39b scrapes off the the toner remaining on the drum 31. Thereafter, a discharge lamp 40 illuminates the entire surface of the drum 31 to erase the charge left on the drum 31, thereby preparing it for another copying cycle.

Referring again to FIG. 1, the paper P is fed from a cassette 41 or a manual feed table 41 by a pick-up roller 43. A registration roller pair 44 drives the paper P such that the paper P meets the toner image formed on the drum 31. After the toner image has been transferred from the drum 31 to the paper P by the transfer charger 35, the paper P is separated from the drum 31 by the separation charger 36 and a separator shown in FIG. 2. A belt 45 conveys the paper P to a fixing unit 46. After the toner image has been fixed by the unit 46, the paper P is driven out of the copier.

Figure 3B:
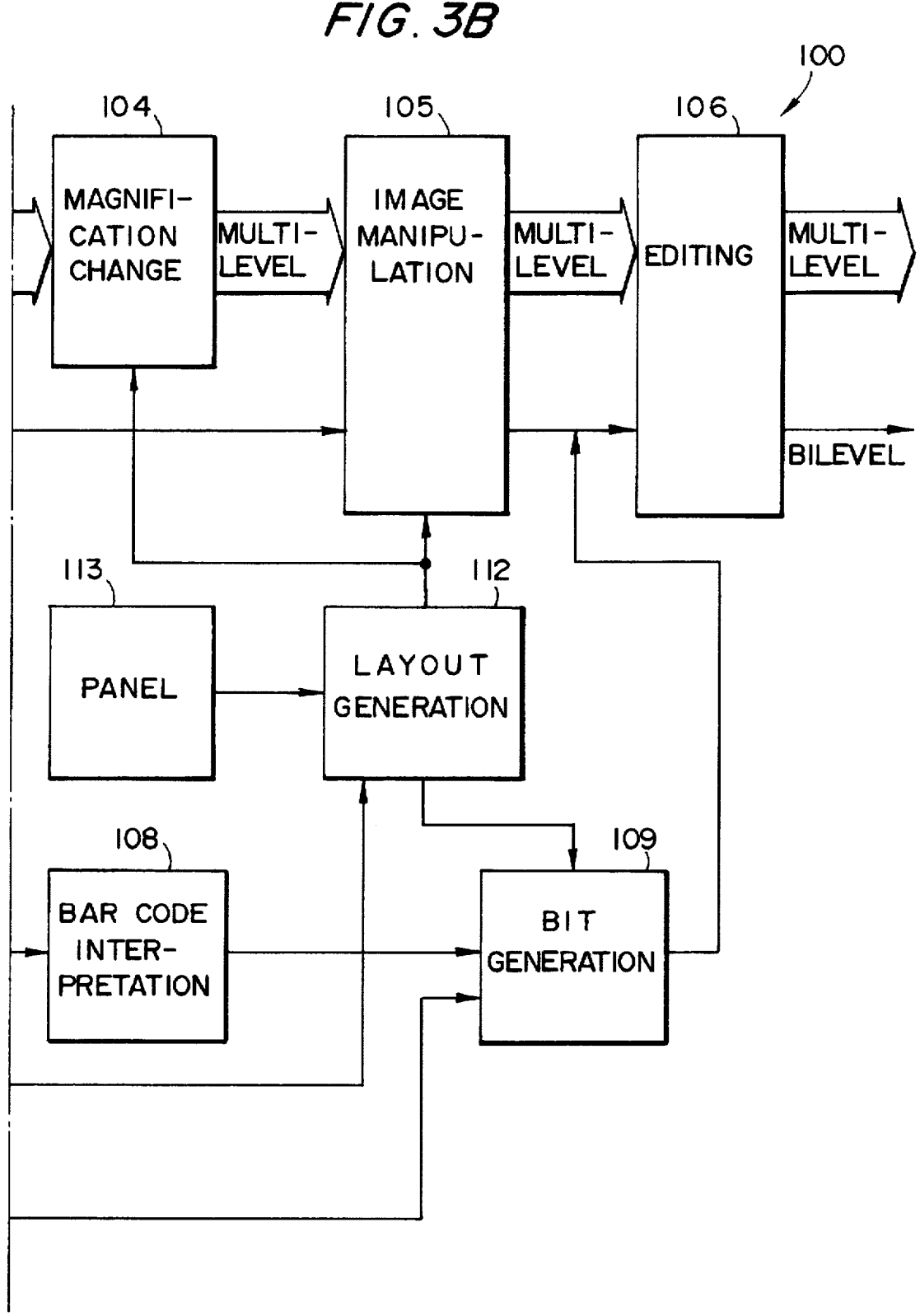
FIG. 3 is a block diagram divided into separate FIGS. 3A and 3B schematically showing the embodiment.

As shown in FIG. 3, the bar code recording device 100 includes a filter 101. The image signal output from the image sensor 17 is digitized, subjected to shading correction, and then fed to the filter 101 as multilevel data. The filter 101 executes MTF (Modulation Transfer Function) correction and smoothing with the input data. A tonality processing 102 performs gamma conversion with the output of the output data of the filter 101. A text/photo separation 103 separates a text portion and a photograph portion if they exist in the document image together. The tonality processing 102 executes text mode processing, text/photo mode processing or photo mode processing, depending on the text or photograph portion identified by the separation 103. Specifically, the separation 103 identifies a text or photograph portion on the basis of the number of edges included in a predetermined area (5×5 dots). In the text mode, the tonality processing 102 binarizes the data by using a predetermined threshold.

A magnification change 104 changes, in the main scanning direction, the magnification of the multilevel data output from the tonality processing 102. An image manipulation 105 outlines, shadows, italicizes, moves or otherwise manipulates the multilevel data from the magnification change 104 and the bilevel data from the tonality processing 102. An editing 106 combines, repeats, decomposes or otherwise edits the output data of the manipulation 105. The resulting output of the editing 106 s sent to the writing optics 20, FIG. 1.

Further, the bilevel data from the toner processing 102 is delivered to a bar code recognition 107. The bar code recognition 107 distinguishes a bar code image and a text image on the basis of the arrangement of pixels in, for example, a 5×5 dots matrix. A bar code image, identified by the recognition 107, is interpreted and transformed to a character code by a bar code interpretation 108. The character code is converted to a character image by a bit generation 109 and then combined with the document image by the editing 106.

Document data (character codes) generated by, for example, a word processor are input to a bar code conversion 111 via an external interface (I/F) 110. The conversion 111 converts the input data to bar code information, a predetermined unit at a time. The bit generation 109 transforms the bar code information to bit map information, i.e., bar code image. Then, the editing 106 combines the bar code image with the document image. Character code information entered in the form of a speech is converted to an electric signal by a microphone, not shown, and then input to the external I/F 110. In this case, the conversion 111 recognizes the speech and transforms it to bar code information.

When a layout command is entered on an operation and display panel (PANEL) 113 or the word processor, a layout information generation 112 determines a bar code area and a document image area and delivers information representative of their positions to the magnification change 104, image manipulation 105, and bit generation 109. The panel 113 allows a bar code area and a document image area to be entered via a tablet. In addition, the layout information generation 112 determines whether or not the bar code satisfies a necessary condition. For example, when the scanner 10 has a resolution of 400 dots per inch (dpi), thin lines included in a bar code cannot be accurately read by a bar code reader unless they have widths and distances of more than three dots. Specifically, widths and distances each corresponding to five dots to ten dots enhance reliable reading. If the bar code does not satisfy such a condition, the generation 112 inhibits it from being printed. When bar code information are input via the I/F 110, the generation 112 executes control so as to satisfy the above condition. Further, when the total amount of bar code information is input via the I/F 110, the generation 112 increases the widths and distances of thin lines as far as possible, while balancing the bar code with, for example, a photograph portion by calculation.

If the bar code to be read by a bar code reader lacks in reliability, the layout information generation 112 may cause the panel 113 to display a message showing that the bar code cannot be printed. If desired, how much of the bar code will be lost may be displayed in percentage on the basis of the total amount of bar code information or the estimated value of the total amount, and the size and quality of papers. In any case, the display uses tho user to enter adequate bar code information which can be printed on a paper.

In operation, as shown in FIG. 4, [I], a document image area 202 and a bar code area 203 on a paper 201 are entered in the form of position information. In response, the layout information generation 112 calculates a ratio by which the document image should be reduced in size or a position to which it should be moved, on the basis of the position information of the image area 202. Reduction in the scanning direction is effaced by the magnification change 104 electrically, while reduction in the subscanning direction is effected by the scanner 10 optically. The document is moved by the image manipulation 105, as needed.

As shown on an enlarged scale in FIG. 4, [II], bar code images are arranged in horizontal arrays on a bar code basis. When a bar code reaches the end in the horizontal direction halfway, it is shifted to the next line. As shown in an enlarged scale in FIG. 4, [III], a single bar code image has line widths a, b and c, and a line distance d. The widths a–c and distance d are recorded in a size which can be identified by a bar code reader.

Figure 5:
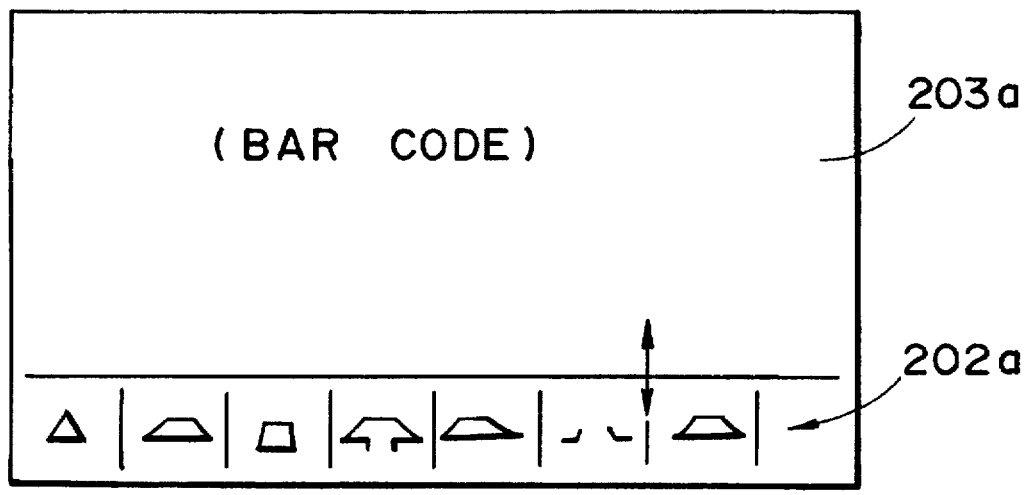
FIG. 5 shows another specific procedure available with the embodiment for decomposing a document image into blocks, rearranging them, and then combining them with a bar code image.

FIG. 5 shows another specific document image area 202a in which the image area 202 of FIG. 4, [I] is decomposed into a plurality of blocks in the vertical direction and then arranged on the paper 201 in the horizontal direction. In this case, a bar code area 203a is rectangular and can accommodate the bar code images therein. A decompose command for setting up such a layout is entered by the operator.

Figure 6:
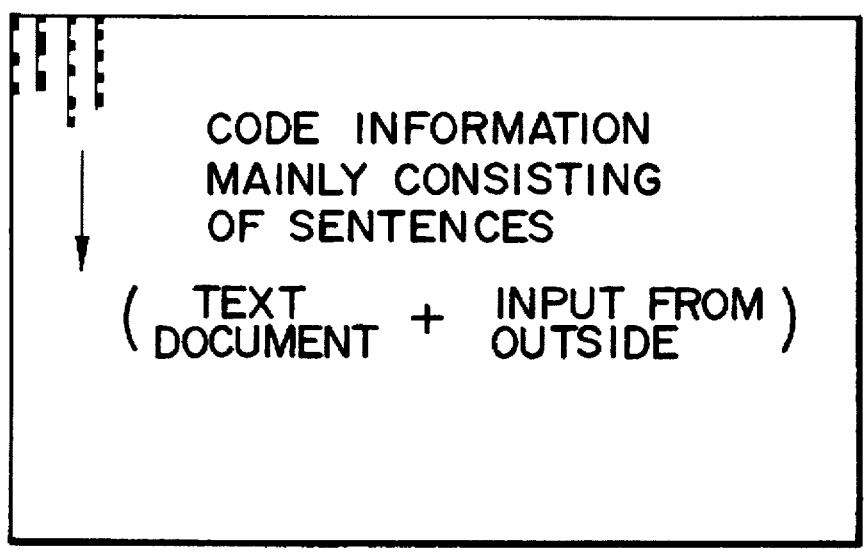
FIG. 6 shows still another specific procedure available with the embodiment for convening text image to a bar code image and then recording it.

FIG. 6 shows a case wherein the document image consists only of or mainly of characters. As shown, bar code images representative of the character images are printed on the paper 201. This kind of scheme allows a text document and a document produced by, for example, a word processor to be combined and then printed on the paper 201 in the form of bar codes.

As for document images to be formed by a copier or a printer, the precondition is that they be recognizable by eyesight. Therefore, this kind of images are printed on papers in density close to the density of documents, so that they are legible. By contrast, bar code images should be recognized by a bar code reader, as stated earlier. The problem with an ordinary copier is that it does not inhibit copying when the toner is short, although it has an automatic density control function. Hence, it is impossible to determine by eyesight whether or not bar code images printed on papers can be read code by a bar code reader. It is, therefore, likely that bar images printed on a paper and simply left for a long time cannot be recognized by a bar code reader later. An implementation for eliminating this problem will be described with reference to FIGS. 7–11.

The bar code recording device 100, FIG. 3, combines bar codes with a document image, as stated earlier. As shown in FIG. 7, the output signal of the recording device 100 is applied via an AND gate 125 to a laser diode (LD) 126 included in the writing optics 20. The photosensor 34, FIG. 2, senses the density of a predetermined toner pattern formed on the drum 31. The resulting density data from the photosensor 34 is digitized by an analog-to-digital converter (ADC) 121 and then fed to a microprocessor (MPU) 122. In response, the MPU 122 causes a solenoid driver 123 to turn on and turn off the previously mentioned toner replenishing clutch, thereby controlling the toner concentration or image density. At the same time, the MPU 122 delivers a copy inhibit signal to the AND gate 125.

More specifically, as shown in FIGS. 8A and 8B, the photosensor 34 is made up of a light emitting diode (LED)

34a and a phototransistor 34b. As shown in FIG. 8A, when the density of the pattern formed on the drum 31 is low, the reflection from the pattern is intense. On the other hand, as shown in FIG. 8B, when the density is high, the reflection is feeble. As shown in FIGS. 9 and 10, the MPU 122 causes the predetermined pattern to be formed on the drum 31 once for ten copies. When the density x of the pattern is lower than a predetermined threshold level B, the MPU 122 causes fresh toner to be replenished. If the density x is tower than a copy inhibition level C (<B), the MPU 122 outputs a copy inhibit signal.

As shown in FIG. 11, when the density x is sequentially lowered due to repeated copying cycles, i.e., the consumption of the toner, but if some toner is still left in the casing of a developing unit, fresh toner is supplied to the developing sleeve 33 with the result that the density x increases. However, if no toner is left in the casing or supplied to the sleeve 33, the density x is further lowered. Then, the MPU 122 inhibits copying, as stated above. This successfully eliminates the problem stated previously.

As described above, the embodiment combines a document image with bar code images by reducing, or moving, or decomposing and rearranging the document image, and then prints them on a paper together. Hence, the document image is prevented from overlapping the bar code images on the paper. Further, character images existing in a document image are trans formed to a second bar code image. The second bar code image is combined with the first bar code image and then printed on a paper. This prevents the first and second bar codes from overlapping each other on the paper. In addition, because bar code images are provided with line widths and line distances capable of being read by a bar code reader, they can be surely read by a bar code reader.

2nd Embodiment

This embodiment pertains to bidimensional bar codes allowing control data for faithful display and printing to be recorded, and a paper media system capable of dealing with this kind of bar codes. To better understand the embodiment, a brief reference will be made to a conventional paper media system, shown in FIG. 12. As shown, the system, generally 300, has an apparatus body 301 incorporating a processing device shown in FIG. 13. A display 302 is connected to the apparatus body 300 in order to display the results of processing and other information. A scanner 303 is also connected to the apparatus body 301 and reads bidimensional bar codes 305 printed on a paper, as shown in FIG. 14.

As shown in FIG. 13, the processing device has a code reproduction 401 and an application software tart-up 402. Bidimensional bar codes 305, FIG. 14, are read by the scanner 303 as an image and then fed to the code reproduction 401. The code reproduction 401 reproduces code information from the bar codes 305. It is to be noted that the result of reproduction is not limited to code information, but it may be image information. For example, information generated by a word processor is code information, while information generated by the scanner 303 and represented by dots is image information. Let the following description concentrate on image information by way of example.

The reproduced code information is sometimes filed in the format of a particular application, e.g., a DOS (Disk Operating System) format. Then, to transfer the data file to, for example, the display 302, the application software start-up 402 reads it and transfers it to the display 302. When the image information is represented by simple dot data not depending on the application, it may be directly displayed on the display 302. Because the bidimensional bar codes 305 are representative only of data to be displayed or printed out, the distinction between image information and code information, whether or not an application is necessary and other information must be entered by hand beforehand. Then, the file is reproduced, and an application is started up, if necessary.

FIG. 15 shows a specific procedure for reproducing the file, and displaying it directly or by way of the start-up of an application. As shown, the kind of the bidimensional bar codes is entered (step 501). Then, the scanner 303 reads the bar codes 305 (step 502). The code reproduction 401 reproduces code information from the output of the scanner 303 (step 503). As a result, the code information is displayed on the display 302 (step 504).

As stated above, in the conventional paper media system 300, the bidimensional bar codes 305 are representative only of data to be displayed or printed out, and minimum necessary physical information for reproducing the data. Hence, various control information from an application, e.g., the distinction between image information and code information, whether or nor an application is required, and the presence/absence of optional characters, optional character data, and the presence/absence of font designation which are necessary for display or printing must be entered by hand. Moreover, if a font is not designated, data cannot be faithfully displayed or printed out.

As shown in FIG. 16, a paper media system embodying the present invention is shown and generally designated by the reference numeral 600. As shown, the system has an apparatus body 601 incorporating a processing device shown in FIG. 17. A media driver 602 records reproduced code information on a medium. A printer 603 prints out data based on the code information. A scanner 604 reads bidimensional bar codes particular to the embodiment. As shown in FIG. 18, The bar codes consist of a control portion (control bar code pattern) 605a and a data body portion (data bar code pattern) 605b. The data body portion 605b is a portion of bilevel bar-coded data to be stored or a portion of image data (or code dat) to be bar-coded. The control portion 605a is a portion storing control information to be used to display or print out the portion 605b. The control portion 605a may be interposed between nearby data body portions 605a or located at the rear of the portion 605a.

Examples of the information to be stored in the control portion 605a are as follows.

(1) Information (image information or code information) representative of the kind of data stored in the body portion 605b. This information frees the user from the manual inputting operation.

(2) Division information and position information when the body portion 605b is made up of a plurality of blocks. This information allows a document to be surely reproduced.

(3) Application information, font information and position information for displaying or printing the reproduced file information in an image. This information makes it needless for the user to start up an application by hand.

(4) Copyright information, secrecy information, output level information for limiting the display output, and search information (e.g. a title and part of an image). This information allows document information to be output in a format matching the operator's intention.

As shown in FIG. 17, a bar code reproduction (reproducing means) 612 is connected to a scanner 611 and reproduces bidimensional bar codes 610. Serially connected to the bar code reproduction 612 are a control portion separation 613, a control portion analysis (analyzing means) 614, a body portion reproduction (body portion reproducing means) 615, a reconstruction (reconstructing means) 616, and a display 617.

The operation of the illustrative embodiment will be described with reference to FIG. 19. As shown, The information of the bidimensional bar codes 610 read by the scanner 611 (step 61) are reproduced by the bar code reproduction 612 (step 62) and then stored in the reproduction 612 for a moment. The control portion separation 613 separates the control portion 605a from the other information (step 63). The control portion analysis 614 analyzes the separated control portion 605a and thereby obtains information relating to the manipulation of the body portion 605b (step 64). If the control portion 605a includes secrecy information, a code information or an ID (Identification) number for determining, for example, a reconstruction level is input to the analysis 614 from the outside. In response, the analysis 614 delivers the body portion 605b to the reproduction 615 implemented by application software (including emulation). The reproduction 615 reproduces the body portion 605b (step 66). At this instant, if optional character information or font information is present, the reproduction 615 automatically searches for the designated data in the reconstructed environment and sets it (step 65). If an optional character or similar data dependent on the user is present, it is included in the body portion 605b. Then, the reproduction 615 reproduces the information and references it. If the application software of the body portion 605b is not a usual one, then the entire application software (or only part thereof including a display driver) is recorded in the body portion 605b.

The body portion 605b reproduced in the step 66 is fed to the reconstruction 616. In response, the reconstruction 616 reconstructs an original document by referencing, for example, the position data (step 67). The contents of the document appear on the display 617 (step 68). The reconstructed 603 or document may be printed on a paper by the printer written to a floppy disk or similar memory device by the media driver 602.

If information other than the control portion 605a is found in the step S63, whether or not it is image information is determined (step 69). If the answer of this step is negative, the step 65 and successive steps are executed. If otherwise, the information is spread out as an image (step 70). Then, the reconstruction 616 reconstructs an original image and displays it on the display 617. Again, the document may be printed on a paper by the printer 603 or written to the memory device by the media driver 602.

While the embodiment reproduces the control portion 605a and body portion 605b at a time, it may be modified in such a manner as to reproduce the control portion 605a first, determine whether or not to reproduce the body portion 605b by examining the control information, and then reproduce the body portion 605b, if necessary.

FIG. 20 shows an arrangement for producing bidimensional bar codes and built in the apparatus body 601, FIG. 16. As shown, the arrangement includes a conversion 620 for transforming document data (original document) to a file. Specifically, the conversion 620 produces a DOS file or similar file (step 71). At this instant, an image is transformed to a TIFF (Tagged Image File Format) or similar image file 621. Likewise, a character portion is transformed to a character code information file 622 while optional character data and font data are transformed to an optional character and font file 623. Further, to reproduce the document from code information, an application software file 624 is prepared. These are executed in steps 72, 73 and 74. The conversion 620 separates the control information from the body portion and delivers it to a control portion generation 626 (steps 72 and 75).

The resulting different kinds of file information classified by kind ate input to the bar code generation 625, and each is transformed to a bidimensional bar code (step 76). As for the image, the generation 625 generates a bidimensional bar code on the basis of the contents of the image file 621 (step 77). On the other hand, the conversion 620 and the generation 625 respectively supply a control portion generation 626 with position information (representative of a position for locating the image portion) and layout information (representative of positions to be allocated to the various file information). In response, the generation 626 generates a bidimensional bar code associated with the control portion 605a (step 79).

A combination 627 combines the bar codes of the files output from the bar code generation 625 and thereby generate the body portion 605a (step 78). Subsequently, the combination 627 combines the body portion 605b with the control portion 605a output from the control portion generation 626 to thereby completes the entire bidimensional bar codes (step 80). The resulting bidimensional bar code image is displayed on the display 617 or printed by the printer (step 81).

It is difficult for the bidimensional bar code information to be directly recognized by eye. In light of this, the document may be partly or entirely displayed as an image in the blank portion of the output bar codes. Alternatively, only a secret portion may be transformed to a bidimensional bar code. Further, only the front cover of the document may be displayed, if desired.

It should be noted that the floppy disk to be dealt with by the media driver 602 may, of course, be replaced with, for example, a hard disk or an optical read/write disk. While the above embodiment has concentrated on code information and image information, the present invention is practicable even with voice information or similar pattern information.

The embodiment described above has various advantages as enumerated below.

(1) The original image (text image or graphic image) can be faithfully displayed or printed.

(2) Even a bar code document including optional character data generated by a particular type of apparatus has its characters protected from deformation.

(3) Even when a bar code document generated by a particular type of apparatus is read by an apparatus not loaded with software for spreading it out, the document can be faithfully reproduced.

(4) Even when a data body portion is recorded in a plurality of portions, it can be faithfully reproduced.

(5) An image can be faithfully reproduced on the basis of bar codes.

(6) Document information can be output in a format matching the operator's intention.

3rd Embodiment

This embodiment pertains to an image forming apparatus capable of protecting an image from deterioration due to the reproduction of image information. Typical of conventional methods for reproducing image information is one which reads the original image, transforms it to a time-serial electric signal, and prints it out on a paper either sequentially or collectively or displays it on a display. The problem with conventional image forming apparatuses is that an image is deteriorated due to reproduction because they reproduce image information itself. Particularly, as the generation of copies increases, the deterioration is sequentially accumulated. As a result, the copy becomes illegible some generations later.

Referring to FIG. 22, the image forming apparatus, generally 700, has an image input (scanner) 701 for reading an image and inputting the resulting image information. A bar code conversion (bar code converting means) 702 is connected to the image input 701. An image combination (image combining means) 703 is connected to the conversion 702. An image output (printer, cathode ray tube or the like) 704 is connected to the combination 703. An image processing 705 is also connected to the conversion 702. An operation panel 706 is connected to the image processing 705 and allows various commands to be entered thereon. The conversion 702 is made up of a bar code reading 707, a bar code/code conversion 708, a code/image conversion (image reconverting means) 709, and a code/bar code conversion (bar code reconverting means) 710.

FIG. 23 shows a specific operation of the image forming apparatus 700. As shown, a bar code pattern read by the image input 701 and bar code reading 707 (steps 91 and 92) are delivered to the bar code/code conversion 708. The conversion 708 transforms the bar code pattern to code information (step 93). The code information is fed to the code/image conversion 709 and code/bar code conversion 710. The conversion 709 transforms the code information to image information (step 95) and delivers it to the image combination 703. At the same time, the conversion 710 again transforms the code information to bar code information (step 94) and feeds it to the image combination 703. The combination 703 combines the input image information and bar code information (step 96) and sends the composite information to the image output 704 (step 97). The image output 704 prints out the composite information on a paper or displays it on, for example, a cathode ray tube or a liquid crystal display (step 98).

Assume that a command for changing the magnification of the image, for deleting part of the image, for coloring the image, or for mirroring the image is entered on the panel 706. Then, the content of processing is sent from the panel 706 to the image combination 703. In response, the combination 703 modifies the code information fed from the bar code/code conversion 708 and delivers the modified information to the code/image conversion 709 and code/bar code conversion 710. The conversions 709 and 710 respectively transform the input code information to image information and bar code information. These information are delivered to the image combination 703.

The image combination 703 automatically lays out the image information and bar code information in such a manner that they do not overlap each other. If the overlap is not avoidable, the combination 703 forms the bar code pattern on a different page or on the rear of the same page. For the recognition of a bar code pattern area, there are available a method which causes the operator to mark the area on an editor board or similar input unit, a method which causes a bar code pattern to be written in a preselected position, and an automatic recognition method using the unique configuration of a bar code pattern.

A reference will be made to FIG. 2. For describing a specific automatic layout procedure. The figure shows a specific document having an image area 801 or letter "A", and a bar code pattern 802 representative of image area information. Only the bar code pattern 802 is read and transformed to code information. Then, the image area or letter "A" is reproduced on the basis of the code information. The bar code pattern 802 is also reproduced on the basis of the code information. The image combination 703 combines the image area 801 and bar code pattern 802 and outputs the result of combination to the image output section 704. As a result, a composite image is reproduced, as shown in FIG. 24, (II).

When a magnification change command, edit command, or similar process command is entered on the operation panel 706, the code information derived from the bar code pattern 802 is modified. In this case, the image area and bar code pattern 802 are reproduced on the basis of the modified code information. When the magnification change or similar image processing is executed, it is likely that the image area 801 and bar code pattern 803 overlap each other. In light of this, the image area 801 and bar code pattern 802 reproduced from the code information are laid out in an optimal arrangement by an automatic layout function. For example, assume that the image area 803 covers the entire page due to enlargement or copying, as shown in FIG. 24, (III). Then, the bar code pattern 802 is printed on the rear of the same page, as shown in FIG. 24(IV), or on the next page, as shown in FIG. (V).

FIG. 25 demonstrates a procedure to be executed when the image is processed as stated above. In FIG. 25, the same boxes as the boxes shown in FIG. 23 are designated by the same reference numerals and will not be described in order to avoid redundancy. As shown, code information including the content of magnification change, editing or similar image processing (step 902) and the code information produced in the step 93 are used to change the image (step 901), i.e., to reproduce the image information (step 903) or the bar code pattern 802 (step 904). Then, the bar code pattern 802 is combined with the reproduced image information (step 905). At this instant the automatic layout is executed to prevent, for example, the pattern 802 and the reproduced image from overlapping each other (step 906). If the bar code pattern 802 cannot be printed on the same page as the image as a result of the automatic layout, it is formed on the rear of the same page or on the next page. The composite image produced by the automatic layout is sent to the image output 704, (step 97). Consequently, a reproduction free from deterioration is output, as shown in FIGS. 4. (IV) or 4, (V).

The embodiment shown and described has the following advantages.

(1) An image is free from deterioration despite generation copying.

(2) Information stored in a bar code pattern is preserved even when image processing is executed.

(3) Magnification change, partial deletion, coloring, mirroring and other processing can be executed, as desired.

(4) An image can be automatically shifted to any of image areas derived from image processing.

Various modifications will become possible for those skilled in the art after receiving the teachings of the present disclosure without departing from the scope thereof.

What is claimed is:

1. A bar code recording device comprising:

inputting means for inputting data representative of a bar code;

first bar code converting means for converting said data input via said inputting means to a bar code image; second bar code converting means for converting a character image existing on a document image to a bar code image;

combining means for combining said bar code images output from said first and second bar code converting means; and recording means for recording a composite image output from said combining means on a paper.

2. A device as claimed in claim 1, wherein said bar code converting means outputs a bar code image having line widths and line distances which a bar code reader can distinguish.

* * * * *